(12) United States Patent
Mohar (10) Patent No.: US 7,246,613 B1
(45) Date of Patent: Jul. 24, 2007

(54) VEHICLE INTERDICTION DEVICE AND METHOD

(76) Inventor: Robert C. Mohar, 653 Fairview Dr., Crossville, TN (US) 38571-3730

( * ) Notice: Subject to any disclaimer, the term of this patent is extended or adjusted under 35 U.S.C. 154(b) by 209 days.

(21) Appl. No.: 10/922,197

(22) Filed: Aug. 19, 2004

(51) Int. Cl.
*F41B 11/26* (2006.01)

(52) U.S. Cl. .......................................... 124/57; 89/1.11

(58) Field of Classification Search ................ 89/1.11; 102/502; 124/57, 69
See application file for complete search history.

(56) References Cited

U.S. PATENT DOCUMENTS

| | | | |
|---|---|---|---|
| 1,329,990 A | 2/1920 | Muller | |
| 2,823,612 A | 2/1958 | Cox et al. | |
| 2,894,658 A | 7/1959 | Spidy | |
| 3,693,880 A | 9/1972 | Versaw et al. | |
| 3,974,774 A | 8/1976 | Schaffner et al. | |
| 4,223,805 A | 9/1980 | Mackal | |
| 4,240,519 A | 12/1980 | Wynosky | |
| 4,576,346 A | 3/1986 | Gauggel et al. | |
| 4,598,884 A | 7/1986 | Speer | |
| 4,683,735 A | 8/1987 | Magrobi | |
| 5,221,809 A * | 6/1993 | Cuadros | 102/439 |
| 5,249,442 A | 10/1993 | Wright | |
| 5,341,718 A * | 8/1994 | Woodall et al. | 89/1.11 |
| 5,439,188 A | 8/1995 | Depew, Jr. et al. | |
| 5,839,759 A | 11/1998 | Trigo | |
| 5,895,882 A | 4/1999 | Woodall, Jr. | |
| 5,917,406 A | 6/1999 | Postel | |
| 6,244,535 B1 | 6/2001 | Felix | |
| 6,401,590 B1 | 6/2002 | Coakley et al. | |
| 6,481,465 B1 | 11/2002 | Warmerdam | |
| 6,543,365 B1 | 4/2003 | Vasel et al. | |
| 6,715,395 B1 | 4/2004 | Heibel | |
| 2002/0088367 A1 | 7/2002 | Macaleese et al. | |
| 2004/0020350 A1* | 2/2004 | Ritman | 89/1.7 |
| 2004/0089186 A1* | 5/2004 | Brygdes-Price | 102/502 |

* cited by examiner

*Primary Examiner*—Troy Chambers
(74) *Attorney, Agent, or Firm*—Thomas A. Lennox, Esq.

(57) ABSTRACT

A motor vehicle interdiction device with an elastic bladder inserted by hand or fired as an infrared seeking missile into an automobile exhaust pipe and inflated with a compressed gas cartridge.

3 Claims, 7 Drawing Sheets

VEHICLE INTERDICTION DEVICE AND METHOD

FIELD OF THE INVENTION

This invention is directed to a device and method that allows law enforcement personnel to disable a motor vehicle to prevent it from fleeing and to stop a fleeing vehicle.

BACKGROUND OF THE INVENTION

Vehicle chases are common when the person driving a vehicle tries to escape the law enforcement personnel by driving away at a high rate of speed. A study involving interviews conducted in jail cells found that over half of the inmates were willing to run at all costs from the police and almost two-thirds of them believed they would not get caught, while studies show that police are successful in apprehending suspects in a fleeing vehicle in almost ninety percent of the chases. The tools and methods available to law enforcement to stop a fleeing motor vehicle are woefully inadequate. In some situations a chase begins after a police officer approaches a motor vehicle. On these occasions prevention of a possible chase could save property damage and/or bodily injury, but no vehicle interdiction devices are available that can be implemented from the rear of the motor vehicle without damaging the vehicle. The law enforcement personnel are often in a "no win" situation for if they try to chase the vehicle, it results in a collision about one-third of the time with property damage in twenty percent of the chases and, of even greater concern, bodily injury of the police and innocent persons in equal numbers about thirteen percent of the chases. Further, many chases result in some litigation against the public safety department and it is not clear that the convicted criminals are generally sentenced to a significantly longer actual jail term if they run from law enforcement. On the other hand, law enforcement personnel can hardly merely allow the escapee to flee and be allowed to escape. Some states have considered passing laws to prevent law enforcement personnel from chasing criminals on the highways for many offenses to protect innocent citizens. Opponents of such legislation argue that the criminals will quickly realize that all they have to do is run away in a motor vehicle to escape the law. It is imperative to have methods and effective devices to stop a fleeing vehicle. In the past, police officers have shot the tires of the fleeing vehicle, but that technique has been essentially abandoned due to safety concerns. There are available devices, such as spiked barrier strips, that if placed in front of the fleeing vehicle will puncture the tires. There are numerous reports of a criminal traveling at a high rate of speed losing control of the vehicle trying to avoid the strips with terrible results of bodily and property injury in some cases to the police officers laying out the strips. Further, it is difficult in most situations to safely get in front of the fleeing motor vehicle to deploy the device, which once deployed is a substantial risk to other vehicle drivers. Recent U.S. Pat. No. 6,715,395 to Heibel discloses projectile launcher capable of puncturing an inflated tire of a pursued vehicle. The improvement is improved accuracy and safety, but the device does not appear to be risk free in that any device capable of puncturing a tire could inflict substantial damage if it struck a collateral unintended target, such as an innocent bystander. Studies show that most chases are of short duration and most collisions occur in the first five minutes, so the device must be able to be used within a couple of minutes. There is a clear need for a safer non-lethal device to quickly and safely stop a fleeing vehicle from a following position. More particularly, the need is to bring the fleeing auto to a stop without impairing the pursued driver's ability to safely control the vehicle. The device must not leave debris on the roadway after use that causes a significant disruption of traffic and must have sufficient target specificity of minimize potential collateral damage. There are situations where the law enforcement person suspect there is a risk that suspects may attempt to flee in a vehicle and would like to disable that vehicle without damaging the vehicle or creating a risk of damage. A vehicle capturing device that is described in U.S. Pat. No. 5,839,759 requires the chasing vehicle to contact and latch on to the fleeing vehicle with all the attendant risks of injury.

It is well known that plugging up the exhaust of an internal combustion engine, will quickly cause the engine to stall and will disable the vehicle powered by the engine until the plug is removed. The old prank of wedging a potato into the vehicle exhaust pipe has spawned a number of security devices installed in the exhaust pipes of vehicles to prevent unauthorized use of the vehicle. A remote controlled anti-theft device previously installed in the exhaust pipe is described in U.S. Pat. No. 5,917,406 to Postel. An exhaust pipe plug to be locked on the end of a motor vehicle exhaust pipe is described in U.S. Pat. No. 4,683,735 to Magrobi. Similarly, and exhaust pipe lock for internal combustion engines is disclosed in U.S. Pat. No. 5,249,442 to Wright and an exhaust blockage system for helicopter engines is disclosed in U.S. Pat. No. 6,401,590 to Conkley et al. An infrared suppressor plug for turbine engines is shown in U.S. Pat. No. 3,693,880 to Versqw et al., and an acoustical turbine engine tail pipe plug is disclosed in U.S. Pat. No. 4,240,519 to Wynosky. Non-lethal projectile systems are disclosed in U.S. Pat. No. 6,543,365 to Vasel et al. and Patent Application Publication No. 2002/0088367 to MacAleese et al., but the elements of the present invention and the use thereof are not disclosed or even suggested therein. A compressed-ring pneumatic pipe plug disclosed in U.S. Pat. No. 6,481,465 to Warmerdam could possibly be installed in an exhaust pipe for a short period of time, there is no hint that this device could be used in a projectile or for the method of the present invention.

None of the above devices, methods or systems disclose the present invention, nor do they satisfy the needs described above or do they attain the objects of the present invention described below.

SUMMARY OF INVENTION

It is an object of an embodiment of the present invention to provide a device and method that allows a law enforcement officer to disable a fleeing motor vehicle in a fashion that is safe to all concerned including bystanders.

It is an object of an embodiment of the present invention to provide a device and method that satisfies all needs of termination/preemption technologies reported in the *Pursuit Management Task Force Report* of September 1998 by THE NATIONAL LAW ENFORCEMENT AND CORRECTION TECHNOLOGY CENTER, U.S. DEPARTMENT OF JUSTICE, Rockville, Md., USA.

It is an additional object of an embodiment of the present invention to provide a device and method that allows a law enforcement officer to disable a motor vehicle by inserting the device into the rear opening of the exhaust pipe of a vehicle to be disabled, wherein the device inflates plugging the exhaust, stalling the engine, and safely causing the motor vehicle to lose all power and be unable to further flee.

It is an additional object of an embodiment of the present invention to provide a device and method that allows a law enforcement officer to disable a motor vehicle by inserting the above device into the rear opening of the exhaust pipe of a vehicle to be disabled, while allowing an officer to insert the device and avoid standing immediately behind the vehicle.

It is a further object of an embodiment of the present invention to provide a device and method that allows a law enforcement officer to disable a fleeing motor vehicle, wherein the device may be hand held or may be mounted on a pursuing vehicle and activated by an officer in the pursuing motor vehicle to disable the fleeing vehicle within a very short period of time at the start of a chase.

It is an additional object of an embodiment of the present invention to provide a device and method that allows a law enforcement officer to disable a fleeing motor vehicle by firing a heat-guided projectile which enters the rear opening of the exhaust pipe of the pursued vehicle, wherein the projectile inflates on impact, plugging the exhaust, stalling the engine, and safely causing the pursued motor vehicle to a quick, yet controlled, stop.

It is an further object of an embodiment of the present invention to provide a device and method that allows a law enforcement officer to disable a fleeing motor vehicle in a fashion that poses no significant health hazard to the driver and passengers in the pursued motor vehicle, to officers involved in the pursuit, that the device may be operated from a covered position, and to bystanders, while leaving no debris on the roadway after use that might disrupt traffic.

It is an additional object of an embodiment of the present invention to provide a device and method that allows a law enforcement officer to disable a fleeing motor vehicle in a fashion that does not significantly impair the pursued driver's ability to safely control the motor vehicle once the device has been implemented, as the motor of the pursued vehicle stalls and the vehicle comes to a controlled stop.

It is a further object of an embodiment of the present invention to provide a device and method that allows a law enforcement officer to disable a fleeing motor vehicle in a fashion with a projectile with sufficient target specificity to minimize potential collateral impacts upon surrounding vehicles or persons, and further if by chance a projectile did impact collaterally, it is not designed for penetration.

It is an additional object of an embodiment of the present invention to provide a light weight portable device and method that may be deployed by an individual law enforcement officer to disable a fleeing motor vehicle either while standing or from an equipped chase vehicle while driving.

It is a further object of an embodiment of the present invention to provide a device and method that allows a law enforcement officer to disable a fleeing motor vehicle with an easily transportable device that requires minimal training time and costs to achieve maximum competent use.

It is an additional object of an embodiment of the present invention to provide a device and method that allows a law enforcement officer to disable a fleeing motor vehicle within a few minutes of the start of a pursuit without significantly exposing the arresting officer to danger from the fleeing suspects.

An embodiment of the invention is a motor vehicle interdiction device that includes an elastic bladder of a size and shape adapted to be inserted into an exhaust pipe opening of a motor vehicle, a compressed gas cartridge operably connected to the elastic bladder, the cartridge, when opened, being capable of causing the bladder to expand to a size greater than the opening of the exhaust pipe, opening means connected to the gas cartridge adapted to open the gas cartridge when actuated allowing the compressed gas to enter the bladder, and an actuating means connected to the opening means adapted to actuate the opening means when the bladder is inserted into the exhaust pipe opening of the motor vehicle.

It is preferred that the gas cartridge be adapted to be punctured to release the gas and the opening means is adapted to puncture the cartridge when actuated. It is also preferred that the device further include an arm extension member comprising a proximal end connected to the actuating means, a distal end adapted to be gripped by person, and a length adapted to allow the person to insert the bladder into the exhaust pipe opening without having to bend down behind the vehicle. It is further preferred that the device of further include a cylindrical tubular body comprising an aero dynamic head, a frangible forward section and retractable fins extending radially outwardly from a rearward section of the body, an infrared sensor means in the head adapted to locate an exhaust pipe opening on an motor vehicle within a defined conical space fanning out in a direction the projectile is traveling, and guidance means in the rearward section adapted to adjust the path of the flight of the device to direct the flight of the projectile to the exhaust pipe opening, wherein the elastic bladder is located in the frangible forward section of the body, and the actuating means is adapted actuate the opening means to release the gas upon the projectile entering the exhaust pipe of the motor vehicle. It is more preferred that in the device described immediately above that the gas cartridge be adapted to be punctured to release the gas and the opening means is adapted to puncture the cartridge when actuated by the device coming to an abrupt halt. It is most preferred that the actuating means include a weight loaded lever adapted to release a spring loaded pointed rod of the opening means to puncture the gas cartridge when the weight is thrown forward as the device is halted in the exhaust pipe of the motor vehicle A second embodiment of the invention is a motor vehicle interdiction projectile device that includes a cylindrical tubular body comprising an aero dynamic head, a frangible forward section and retractable fins extending radially outwardly from a rearward section of the body, an infrared sensor means in the head adapted to locate an exhaust pipe opening on an motor vehicle within a defined conical space fanning out in a direction the projectile in traveling, and guidance means in the rearward section adapted to adjust the path of the flight of the device to direct the flight of the projectile to the exhaust pipe opening. The device further includes an elastic bladder in the frangible forward section of the body, the bladder operably connected to a compressed gas cartridge adapted to inflate the bladder to a size greater than the exhaust pipe opening of the motor vehicle upon gas being released from the cartridge, opening means attached to the compressed gas cartridge adapted to release the gas when actuated, and actuating means attached to the opening means adapted to actuate the opening means to release the gas upon the projectile device entering the exhaust pipe opening of the motor vehicle. The above-preferred embodiments are applicable for this embodiment.

A third embodiment of this invention is a method of motor vehicle interdiction that includes providing a device that includes an elastic bladder of a size and shape adapted to be inserted into an exhaust pipe opening of a motor vehicle, a compressed gas cartridge operably connected to the elastic bladder, the cartridge, when opened, being capable of causing the bladder to expand to a size greater than the opening of the exhaust pipe, opening means connected to the gas cartridge adapted to open the gas cartridge when actuated allowing the compressed gas to enter the bladder, and actuating means connected to the opening means adapted to actuate the opening means when the bladder is inserted into the exhaust pipe opening of the motor vehicle, and the method then includes inserting the device into an exposed end of a motor vehicle exhaust pipe and actuating the actuating means causing the opening means to open the gas cartridge inflating the bladder device to block flow out of the exhaust pipe and prevent operation of the motor vehicle.

The preferred method that the gas cartridge be adapted to be punctured to release the gas and the opening means is adapted to puncture the cartridge when actuated. A more preferred method is that the device further include an arm extension member comprising a proximal end connected to the actuating means, a distal end adapted to be gripped by person, and a length adapted to allow the person to insert the bladder into the exhaust pipe opening without having to bend down behind the vehicle.

A fourth embodiment of the invention is a method of motor vehicle interdiction that includes providing a gun that includes a tubular barrel, propellant means to propel objects out of the barrel, and trigger means allow a person to activate the propellant means. The method further includes inserting a projectile device into the tubular barrel, the device including a cylindrical tubular body that includes an aero dynamic head, a frangible forward section and retractable fins extending radially outwardly from a rearward section of the body, an infrared sensor means in the head adapted to locate an exhaust pipe opening on an motor vehicle within a defined conical space fanning out in a direction the projectile is traveling, guidance means in the rearward section adapted to adjust the path of the flight of the device to direct the flight of the projectile to the exhaust pipe opening, an elastic bladder in the frangible forward section of the body, the bladder operably connected to a compressed gas cartridge, when opened, being capable of causing the bladder to expand to a size greater than the exhaust pipe opening on the motor vehicle, opening means attached to the compressed gas cartridge adapted to release the gas when actuated, and actuating means attached to the opening means adapted to actuate the opening means to release the gas upon the projectile device entering the exhaust pipe opening of the motor vehicle. The method further includes aiming the gun at an exposed end of a motor vehicle exhaust pipe and actuating the trigger means causing the propellant means to propel the projectile device into the pipe to block flow out of the exhaust pipe and stop the motor vehicle from operating.

DESCRIPTION OF PREFERRED EMBODIMENTS

An important element of this invention is to disable a motor vehicle by providing a device adaptable to be inserted in the rearward opening of the exhaust pipe, that when activated shuts off exhaust flow stalling the vehicle engine. The device may by its shape and material, such as a silicone rubber conical wedge, plug the exhaust pipe as it is inserted, but it is preferred that the device expand after insertion to more effectively stop the exhaust flow and avoid unintended expulsion. This device may be inserted directly by hand or preferably on a handle extension to distance the acting officer from the rear of the vehicle as the officer approaches a vehicle that it is believed may or is likely to flee the scene. For the above hand-inserted devices expansion of the device is preferably by an inflatable bladder more preferably activated by a relatively quiet triggering mechanism. In the inflatable version an explosive charge may be used to puncture a $CO_2$ cylinder, but a levered or spring loaded puncturing device is preferred to avoid alerting suspects in the motor vehicle that seems to be a likely candidate to flee. If the vehicle is starting to flee or is already fleeing the device may be inserted by shooting it as a projectile with a heat seeking guidance system to cause it to locate, enter and plug the exhaust pipe opening. The device may used as a projectile in a wide variety of methods including, but not limited to, by a hand held launcher, such as when the officer starts to approach a motor vehicle driven by suspects and the motor vehicle starts to flee; by a hand held launcher held by the officer out the window of the pursuing motor vehicle during a chase; by a launcher installed on the front of the pursuing motor vehicle at the start of or during a chase; by a launcher installed on the front of a police motor vehicle aimed away from a side of the vehicle as the police vehicle approaches the fleeing vehicle from the side and rearwardly of the fleeing vehicle's path, as well as other methods.

Figure 1:
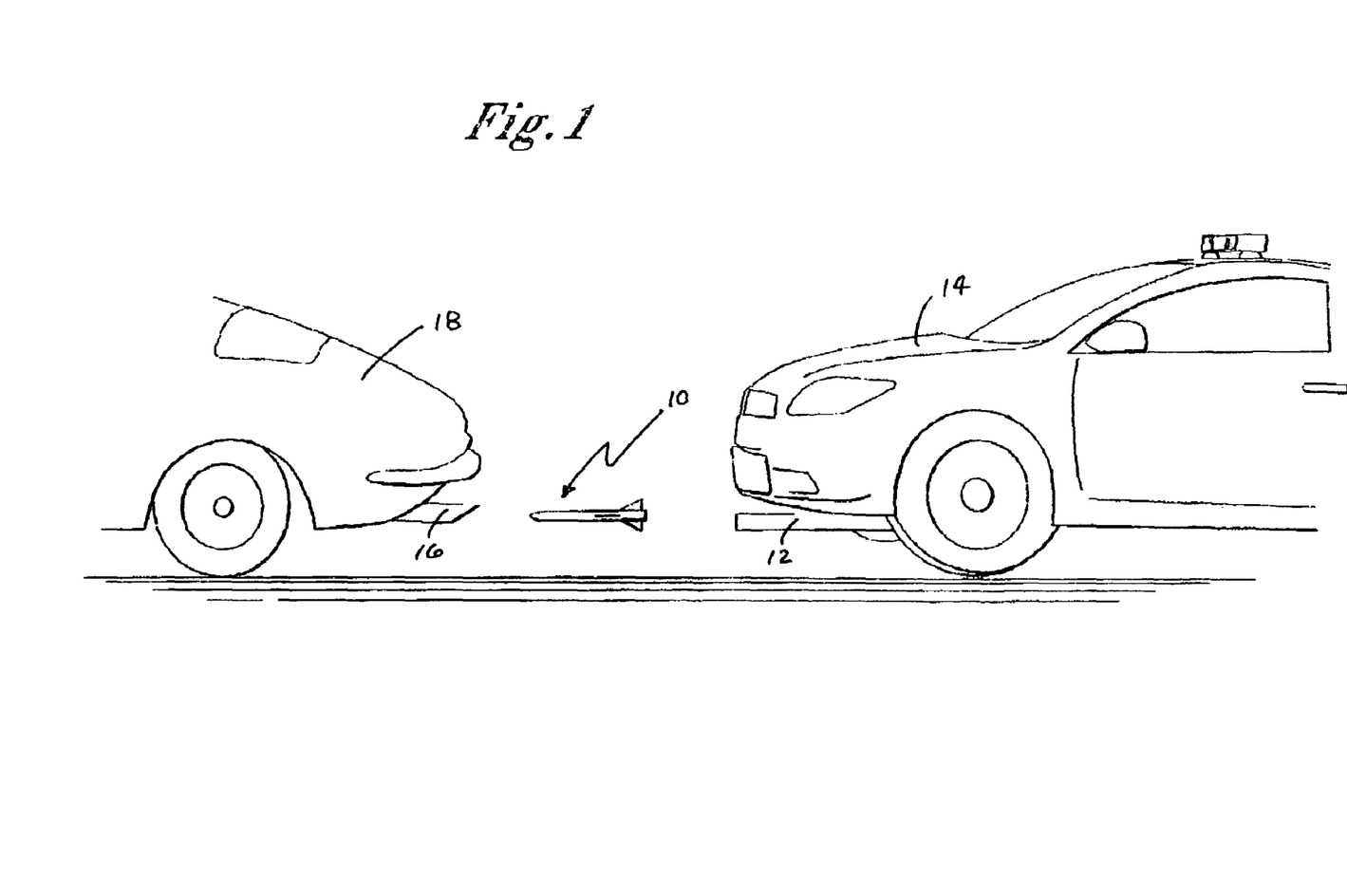
FIG. 1 is a diagram illustrating a method of use of an apparatus of the present invention as a projectile to disable a fleeing motor vehicle.
Figure 4:
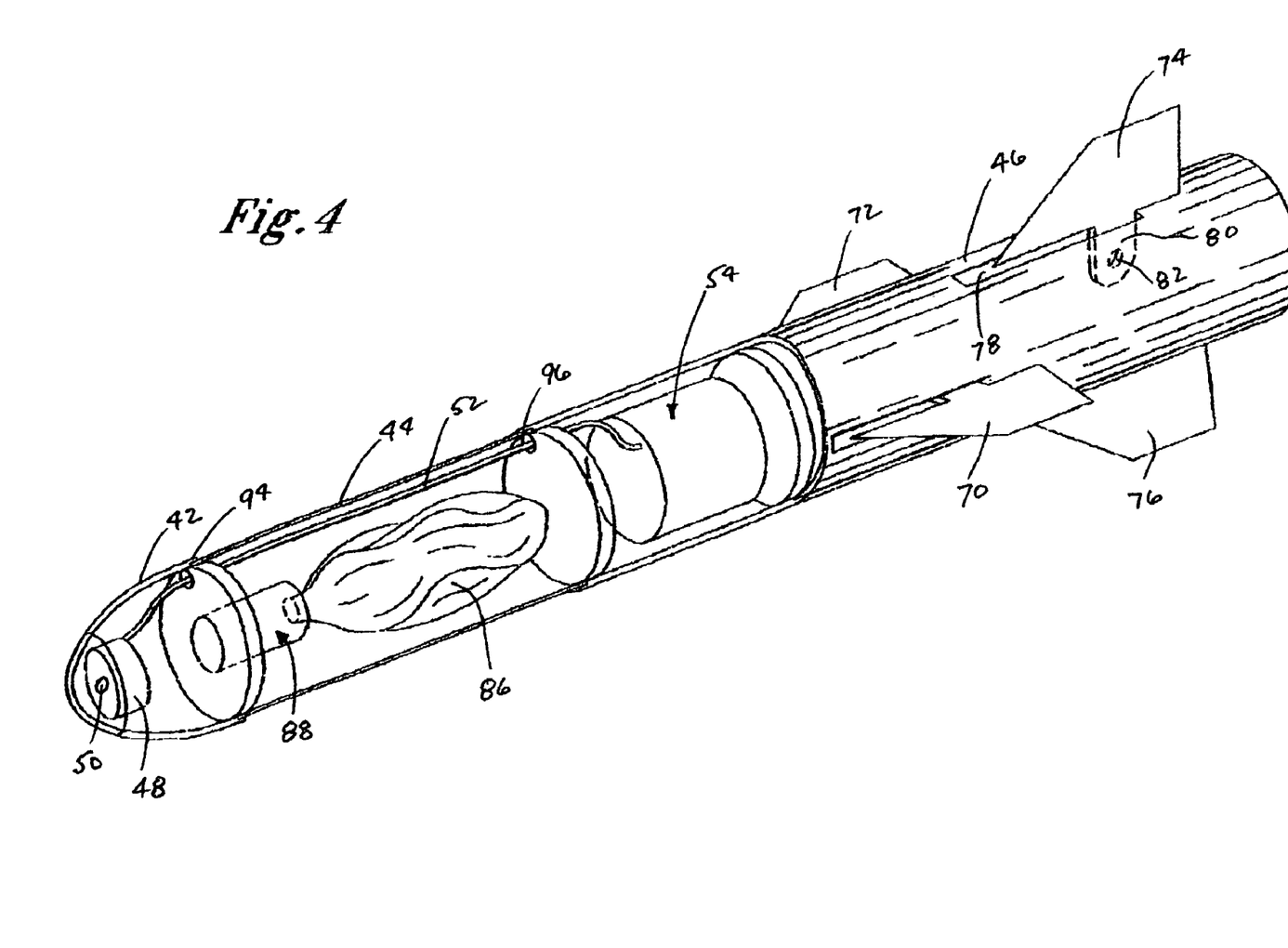
FIG. 4 is a front left side partial cut-away perspective diagram view of a projectile apparatus of the present invention.
Figure 5:
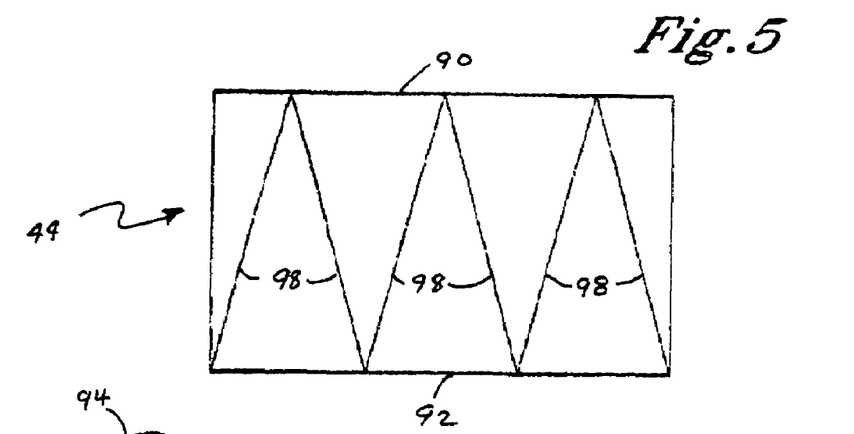
FIG. 5 is a top view of a flattened diagram of a cylindrical frangible break-off section of the body of said apparatus.

Apparatus 10 is a guided projectile as shown and described in FIGS. 4 and 5 and shown in a method of its use in FIG. 1. As noted immediately above apparatus 10 may be used in a variety of situations and the methods of use vary to fit the situation so the scenario depicted in FIG. 1 should not be considered limiting. In FIG. 1, apparatus is fired from a modified standard 37 mm Flare/Gas launcher 12 used by law enforcement agencies to shoot tear gas canisters and flares. A COLT® M203 Grenade Launcher is a lightweight single shot breech loaded 40 mm weapon designed for attachment to the standard Law Enforcement Carbine capable of firing the complete range of non-lethal purpose rounds. This Launcher may be modified for use in the method depicted in FIG. 1, or it may be used as a hand held launcher for projectile 10 in many other situations. The modification is merely removing the shoulder rest from the 37 mm launcher and attaching an extension (not shown), such as a cord, to the trigger of either of the launchers to allow launcher 12 to be fired by an officer in chasing motor vehicle 14. Projectile 10 seeks the heat of exhaust pipe outlet 16 of fleeing motor vehicle 18 and enters pipe 20 coming to an abrupt halt. This action will cause the bladder in projectile 10 to blow up plugging pipe 20 and causing the internal combustion engine of fleeing motor vehicle 18 to shut down causing the vehicle to come to a controlled stop.

Figure 2:
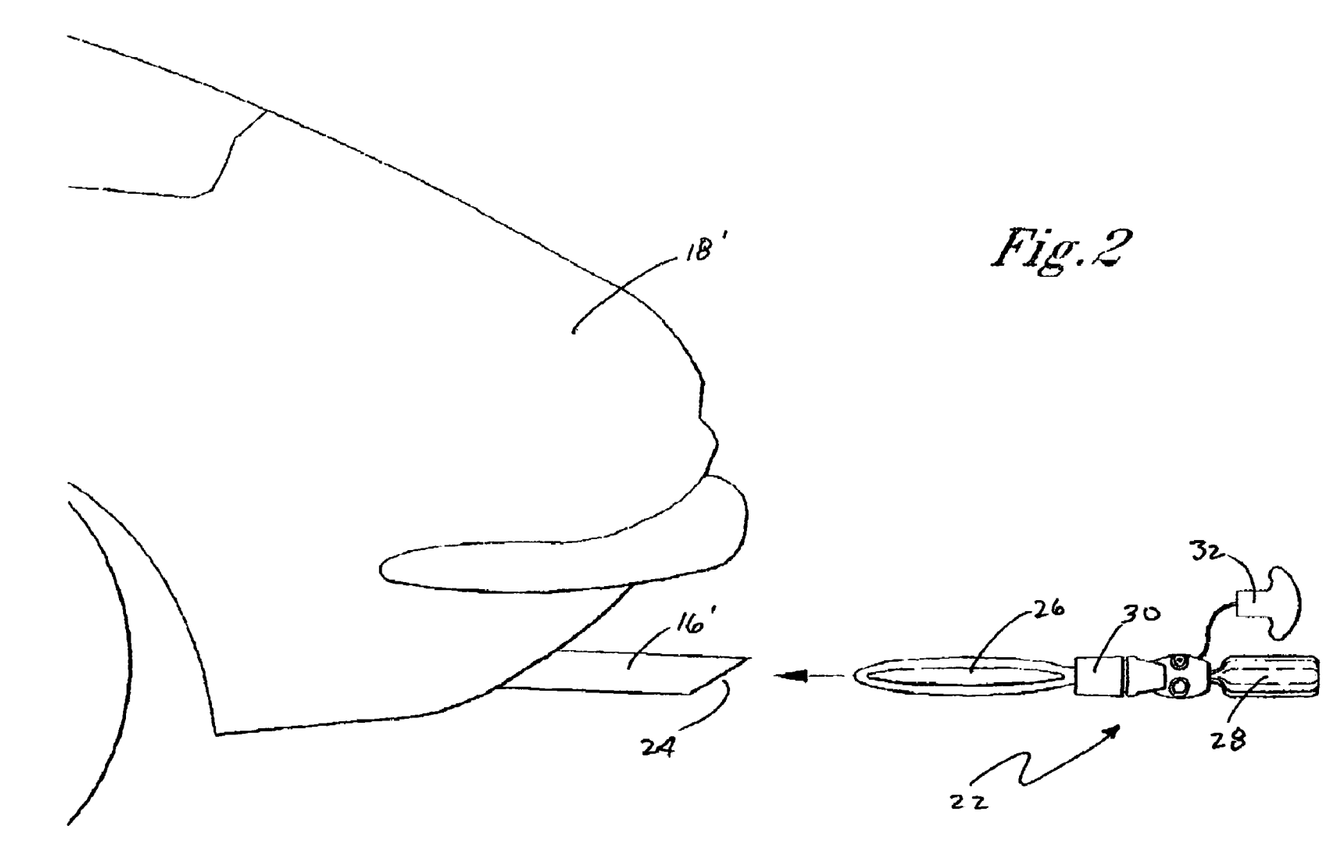
FIG. 2 is a front left side diagram view of an apparatus of the present invention being inserted by hand into an exhaust pipe opening of a motor vehicle.
Figure 3:
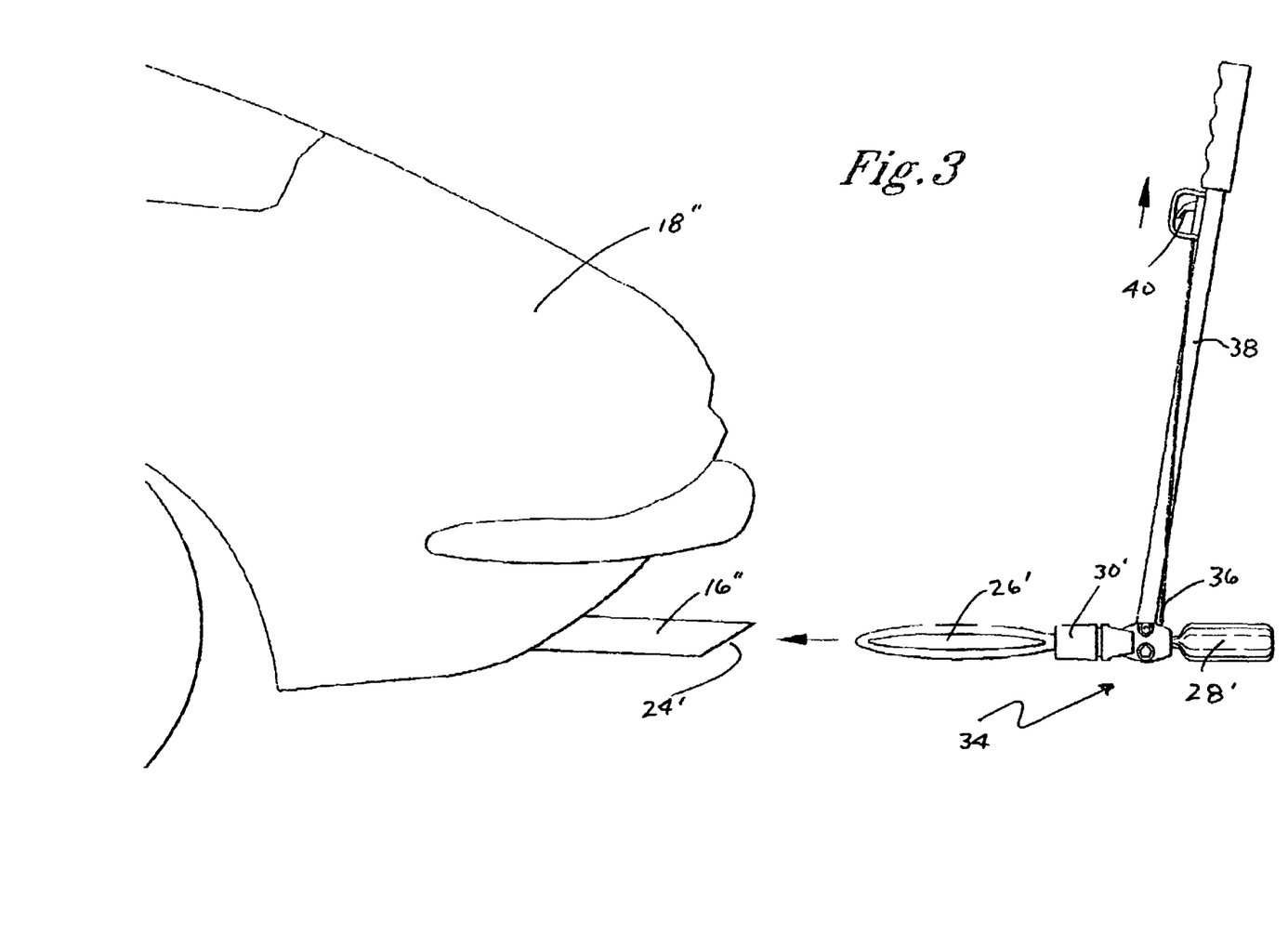
FIG. 3 is a front left side diagram view of an apparatus of the present invention with an extension handle being inserted by hand into an exhaust pipe opening of a motor vehicle without having to bend down or even be directly behind the motor vehicle.
Figure 6:
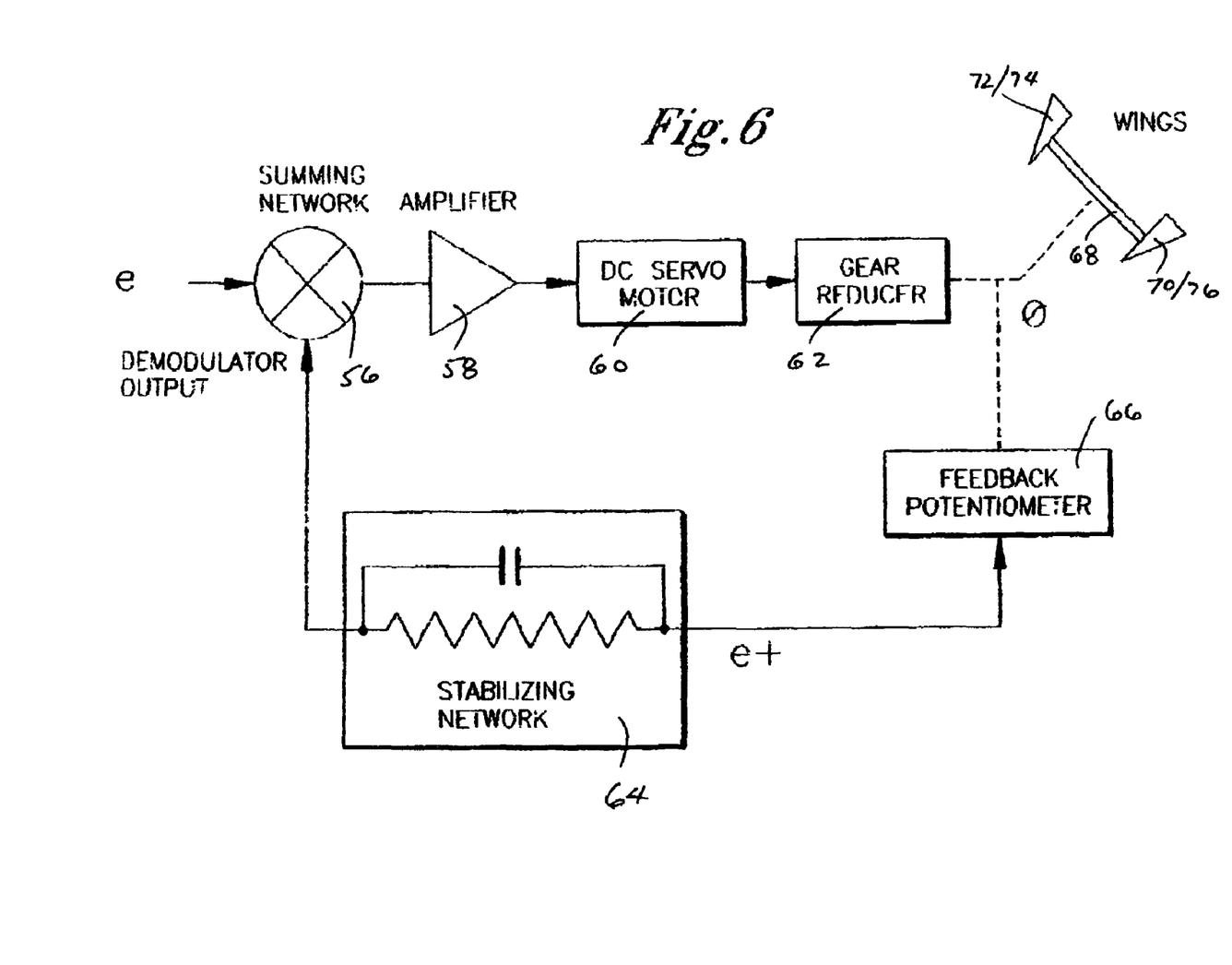
FIG. 6 is a block diagram of the servo-control system of said apparatus.
Figures 7, 8:
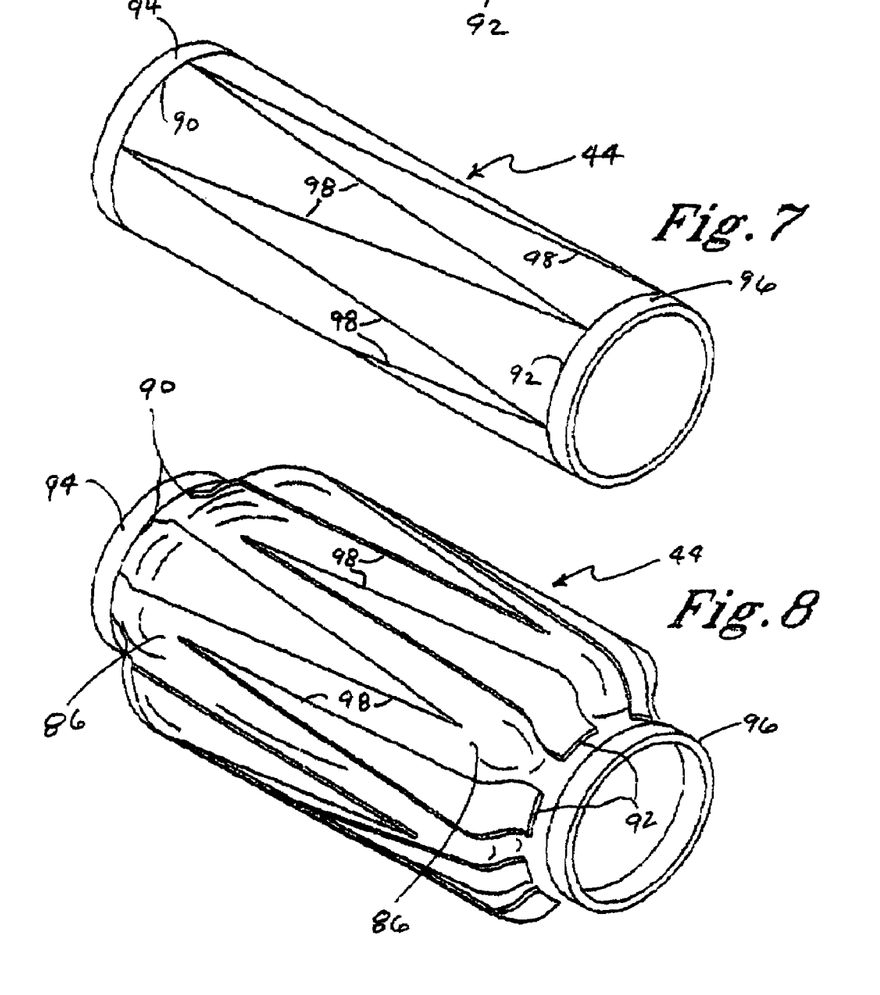
FIG. 7 is a front left side perspective view of the cylindrical section shown in FIG. 5.
FIG. 8 is a front left side perspective view thereof after the bladder has ruptured the cylindrical section expanding outwardly to plug the exhaust pipe.
Figure 9:
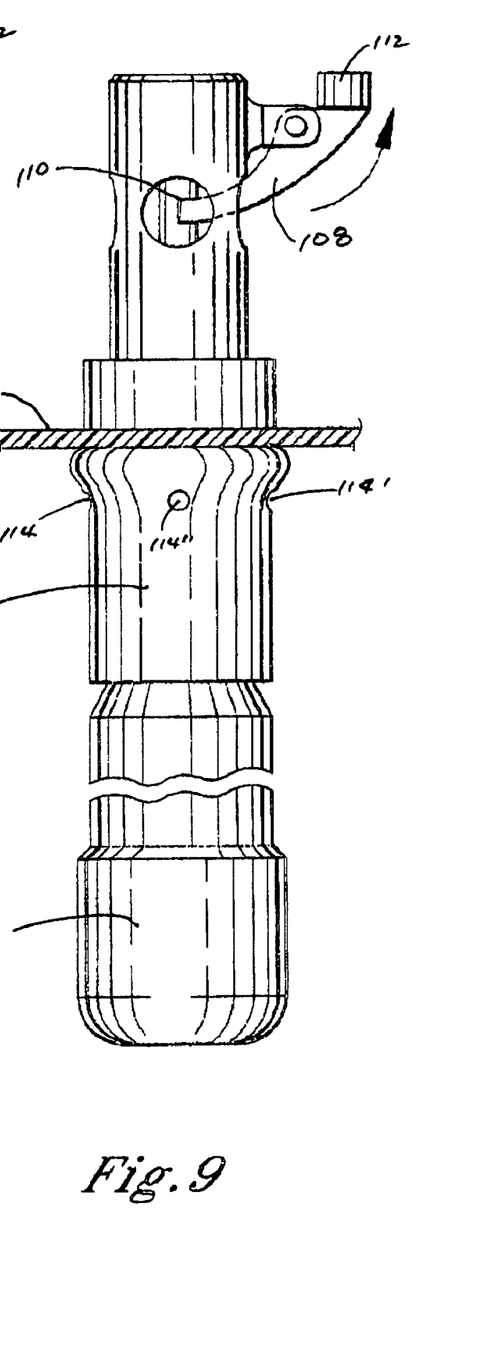
FIG. 9 is front view of actuating and opening means for the compressed gas cylinder of said apparatus.
Figure 10:
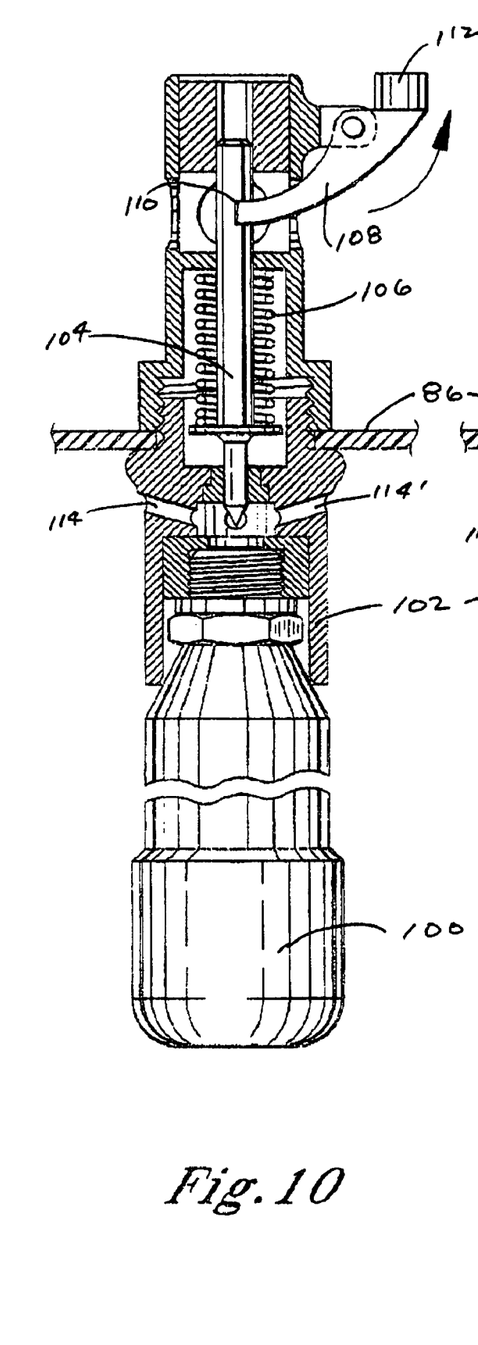
FIG. 10 is partial vertical cross-sectional cut-away view thereof.

In FIG. 2 insertable interdiction device 22 is adapted to be inserted by hand into opening 24 of exhaust pipe 16' of motor vehicle 18'. Collapsed bladder 26 is sealably attached to the inflation device comprising $CO_2$ cylinder 28 threadably sealed to piercing device 30 actuated by pull cord 32. The inflation device is a commercially available unit used for inflating life preservers from HALKEY-ROBERTS CORP., 11600 Dr. Martin Luther King Street, St. Petersburg, Fla. 33716, similar to that described in U.S. Pat. No. 2,894,658 to Spidy, incorporated herein by reference thereto. After the bladder of device 22 is inserted into opening 24 a pull of cord 32 inflates the bladder disabling the vehicle, whether the engine is running at the time or not. This allows a peace officer to temporarily disable the vehicle when there is a suspicion that a present occupant or someone outside the vehicle might enter the vehicle and seize an opportunity to flee the scene. It is a particular advantage to be able to disable the vehicle without risking damaging the vehicle in any way whatsoever. In FIG. 3 insertable interdiction device 34 is adapted to be inserted by hand into opening 24' of exhaust pipe 16" of motor vehicle 18". Collapsed bladder 26' is sealably attached to the inflation device comprising $CO_2$ cylinder 28' threadably sealed to piercing device 30' actuated by pull cord 36 which extends along two foot long extension handle 38 and connected to slide trigger 40, which, when pulled upwardly, releases piercing device 30' piercing cylinder 28' and inflating bladder 26' and plugging exhaust pipe 16". Device 10 is shown in detail in FIG. 4. with the tubular airframe constructed in four parts, nose section 42, frangible front section 44, and rear guidance section 46. The airframe may be constructed of any suitable lightweight sufficiently rigid material including metal, such as aluminum, composites, plastics and other compositions and combinations thereof. Optics 50 of acquisition and tracking sensor 48 includes the soft plastic optics used in throwaway photographic cameras and sensor 48 includes an electro-optical component, such as those similar to the visible/shortwave infrared (SWIR) staring focal plane array, such as a single visible/SWIR spectral band staring focal plane array with about 640.times.480 pixels not unlike those commonly used in camcorders that include a silicon charge-coupled device (CCD) or complimentary-metal oxide-semiconductor (CMOS) FPA 48. the focal plane array 48 operates at slow frame rate sufficient for target identification. Frame rates preferably are at a speed of about 15 Hz or less. Low divert G is generally less than 10G of lateral acceleration as the target set includes stationary or slow moving targets of 100 mph or less, with direction changes from about 2 g's or less. The data update rate, or the focal plane array frame rate, remains correspondingly low due to the low target maneuverability. The trajectory of the guided missile flies along a flat fly-out trajectory from the launcher to the target. The officer firing the missile first identifies the target, thus removing a requirement for the missile of autonomously acquire dim, point source targets. FPA 48 is connected to servo-control system 54 shown as shown in FIG. 6 by connector 52. When missile 10 is launched, fins 70, 72, 74 and 76 are extended through slots 78 and locked to flight position as shown in FIG. 4 by force of a spring which urges a lockshoe against an inclined surface (not shown) integral with fin stubs 80. Details of this mechanism is well known in the art as described in U.S. Pat. No. 5,439,188 to Depew, Jr. et al. Shaft 68 connected to rear fins 74 and 76 and shaft 68' (not shown) connected to front fins 70 and 72 each rotate on 82 through an angle of incidence Ø of ±15° to control the flight of missile 10. Servo-control system 54 used to control fins 70, 72, 74 and 76 is shown in the shown in FIG. 6. The demodulator of seeker guidance output voltage (e) is compared with fin position, which is measured as (e+) by a feedback potentiometer 66 in a summing network 56. The resultant error signal is amplified at 58 to a power level sufficient to drive a D.C. servo motor 60 which rotates the fins through a gear train 62 which is operatively connected to support shafts 68 and 68' (the latter not shown). An RC stabilizing network 64 is included in the feedback loop to improve the dynamic response of the servo to the sinusoidal input voltage. In the absence of tracking error signal (e=0), the feedback signal e+causes the fins to return to center (angle Ø=0) so that no lift force is produced. Interdiction inflation device 84 is positioned inside front section 44 of device 10 and includes bladder 86 and gas canister piercing device 88 shown in FIGS. 9 and 10. In FIG. 5 tubular section 44 is "flattened out" to show the pattern of serrated break apart lines 98 which allow bladder 86 to expand outwardly from the cylindrical body upon inflation to close the exhaust pipe of the vehicle. Cylindrical frangible front section 44 is shown in FIG. 7 with circular front edge 90 engaged in front circular flange 94 and rear edge 92 engaged in rear flange 96 forming cylindrical section 44. As bladder 86 expands thin metal cylindrical section 44 will tear apart along serrated lines 98 as shown in FIG. 8, and disengage along front edge 90 from front circular flange 94 and along rear edge 92 from rear circular flange 96 easing the breaking apart of the body along lines 98 making way for bladder 86 to inflate and close the exhaust pipe. It is not necessary for section 44 to break apart as evenly as depicted in FIG. 8 and the device will operate quite effectively even if major sections of serrated lines 98 remain in tact. Gas canister piercing device 88 is viewed in detail in FIGS. 9 and 10 with gas canister 100 threadably sealed into housing 102 holding piercing sliding rod 104 powered by coil spring 106 which is released when lever 108 rotates and pulls out of slot 110 as weight 112 on the distal end of lever 108 is thrown forward when projectile 10 comes to a sudden halt inside exhaust pipe 16 releasing the $CO_2$ gas through openings 114, 114' and 114" in housing 102 inflating bladder 86 and plugging the exhaust system of the vehicle to stall the engine disabling the vehicle.

Seeker heads for guided missiles are disclosed in U.S. Pat. No. 2,823,612 to Cox et al. and U.S. Pat. No. 4,576,346 to Gauggel et al. A guided missile is disclosed in U.S. Pat. No. 3,908,933 to Goss et al., and an air-delivered remotely activated infrared anti-ship missile decoy device is disclosed in U.S. Pat. No. 5,895,882 to Woodall. These prior art missile guidance systems honing in on an infrared emitting target are well known and may be used in the present invention, but these systems have not been contemplated for use on a short range projectile that depends on external means for its entire thrust. These prior art guidance systems include an imaging optical system, which is mounted on a part suspended on gimbals in the seeker head. The imaging optical system forms a field of view in the plane of reticle appropriately patterned. A missile-fixed detector is located behind the reticle, which is exposed to infrared radiation from the field of view. The gimbal suspended part rotates with high angular speed about an axis extending essentially in the longitudinal direction of the missile, and thus forms a gyro together with the components of the optical system, which gyro is largely decoupled from the missile movements. The rotating, gimbal suspended part comprises a magnet having radial magnetization. A missile-fixed coil is arranged about the rotating part. The signals from the photoelectric detector are applied to the coil with high gain and depend on the size and the direction of the target deviation. They generate torques of the rotating body by electromagnetic interaction of the coil and the magnet, whereby the optical axis is aligned to the target due to the precession motion of the body.

While this invention has been described with reference to specific embodiments disclosed herein, it is not confined to the details set forth and the patent is intended to include modifications and changes which may come within and extend from the following claims.

I claim:

1. A motor vehicle interdiction projectile device comprising:
    (A) a cylindrical tubular body comprising an aero dynamic head, a frangible forward section and retractable fins extending radially outwardly from a rearward section of the body,
    (B) an infrared sensor in the head adapted to locate an exhaust pipe opening on an motor vehicle within a defined conical space fanning out in a direction the projectile in traveling,
    (C) guidance means in the rearward section adapted to adjust the path of the flight of the device to direct the flight of the projectile to the exhaust pipe opening,
    (D) an elastic bladder in the frangible forward section of the body, the bladder operably connected to a compressed gas cartridge adapted to inflate the bladder to a size greater than the exhaust pipe opening of the motor vehicle upon gas being released from the cartridge, and
    (E) a piercer attached to the compressed gas cartridge adapted to release the gas upon the projectile device entering the exhaust pipe opening of the motor vehicle.

2. The device of claim 1 wherein the wherein the gas cartridge is adapted to be punctured to release the gas and the piercer is adapted to puncture the cartridge when actuated by the device coming to an abrupt halt.

3. The device of claim 1 wherein the device further comprises a weight loaded lever adapted to release the piercer, which comprises a spring loaded pointed rod adapted to puncture the gas cartridge when the weight is thrown forward as the device is halted in the exhaust pipe of the motor vehicle.

* * * * *